United States Patent
Schuh et al.

(10) Patent No.: US 12,532,876 B2
(45) Date of Patent: Jan. 27, 2026

(54) DYNAMICALLY ADJUSTING TREATMENT BUFFERS FOR PLANT TREATMENTS

(71) Applicant: Deere & Company, Moline, IL (US)

(72) Inventors: Austin Schuh, Sunnyvale, CA (US);
Stephan Pleines, Sunnyvale, CA (US);
Matthew Potter, Sunnyvale, CA (US);
Jacob Goldstein, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 17/840,240

(22) Filed: Jun. 14, 2022

(65) Prior Publication Data

US 2023/0276782 A1    Sep. 7, 2023

Related U.S. Application Data

(60) Provisional application No. 63/316,356, filed on Mar. 3, 2022.

(51) Int. Cl.
| | |
|---|---|
| *A01M 7/00* | (2006.01) |
| *A01G 7/06* | (2006.01) |
| *G06T 7/73* | (2017.01) |
| *G06V 20/68* | (2022.01) |

(52) U.S. Cl.
CPC ............. *A01M 7/0089* (2013.01); *A01G 7/06* (2013.01); *G06T 7/73* (2017.01); *G06V 20/68* (2022.01); *G06T 2207/30188* (2013.01)

(58) Field of Classification Search
CPC .... A01M 21/04; A01M 21/043; A01M 21/00; A01M 7/0089
See application file for complete search history.

(56) References Cited

U.S. PATENT DOCUMENTS

| | | | | |
|---|---|---|---|---|
| 5,278,423 | A * | 1/1994 | Wangler | G01S 17/42 47/1.7 |
| 11,477,935 | B1 * | 10/2022 | Muehlfeld | A01M 7/0089 |
| 11,998,000 | B2 * | 6/2024 | Kwak | B60R 1/00 |
| 2014/0180549 | A1 | 6/2014 | Siemens et al. | |

(Continued)

FOREIGN PATENT DOCUMENTS

| | | |
|---|---|---|
| EP | 4186344 A1 | 5/2023 |
| WO | WO 2021/176254 A1 | 9/2021 |

OTHER PUBLICATIONS

European Patent Office, Extended European Search Report and Written Opinion, European Patent Application No. 23156588.8, Jul. 25, 2023, 9 pages.

*Primary Examiner* — Katelyn T Truong
(74) *Attorney, Agent, or Firm* — Fenwick & West LLP

(57) ABSTRACT

As a farming machine travels through a field of plants, the farming machine accesses an image of a field including a plant and receives sensor signals from one or more sensors coupled to the farming machine. The farming machine applies the image and sensor signals to a computer model to determine a spatial relationship between a treatment mechanism of the farming machine and the plant. Determining the spatial relationship produces an uncertainty measurement for an expected position of the treatment mechanism respective to an expected position of the plant. The farming machine adjusts a treatment buffer based on the uncertainty measurement. The farming machine treats the plant in the field by applying the plant treatment to the plant based on the treatment buffer.

23 Claims, 8 Drawing Sheets

(56) References Cited

U.S. PATENT DOCUMENTS

| | | | |
|---|---|---|---|
| 2019/0362146 A1* | 11/2019 | Polzounov | G06T 7/10 |
| 2020/0230633 A1* | 7/2020 | Serrat | A01M 21/043 |
| 2020/0342225 A1* | 10/2020 | Schumann | G06N 20/00 |
| 2021/0321554 A1* | 10/2021 | Liu | A01C 21/005 |
| 2022/0211026 A1* | 7/2022 | McCann | A01M 7/0089 |
| 2022/0304296 A1* | 9/2022 | Chapple | A01M 7/0042 |
| 2024/0049697 A1* | 2/2024 | Schmeer | A01M 21/043 |

* cited by examiner

DYNAMICALLY ADJUSTING TREATMENT BUFFERS FOR PLANT TREATMENTS

CROSS-REFERENCE TO RELATED APPLICATIONS

This application claims the benefit of provisional patent application No. 63/316,356, filed Mar. 3, 2022, the entirety of which is incorporated by reference.

TECHNICAL FIELD

The described subject matter generally relates to farming technology, and, in particular, to managing the application of a treatment compound to a plant in a field.

BACKGROUND

Conventional farming machines for treating crops in a field are controlled by human operators. Currently, some operations may be computer-assisted, but human control is a prevailing reality of farming machines, and those farming machines with automated functionality encounter frequent issues that prevent normal operation. Attempts to automate farming machines encounter frequent difficulties and failures, often due to the varying reliability of the data, received from sensors on the automated farming machines, which the farming machines use to operate.

Farming machines apply treatment compounds to plants in fields. For example, a farming machine uses a nozzle to direct a fluid containing a treatment compound onto a plant as the farming machine moves over or past the plant in the field. Broadly distributing treatment compounds across a field can be wasteful, as only part of the treatment compounds reach the targeted plants. Precisely and accurately targeting plants for the application of treatment compounds, meanwhile, is difficult, particularly as a farming machine moves through a field.

SUMMARY

In an embodiment of a method of a farming machine, as the farming machine travels through a field of plants, the farming machine dynamically adjusts a treatment buffer during performance of a plant treatment in the field. The treatment buffer is a portion of a treatment area to which plant treatment is applied, and includes a buffer region around the estimated position of a plant.

The farming machine accesses an image of the field that includes a plurality of pixels. The plurality of pixels includes pixels that represent a plant in the field. The farming machine also receives sensor signals from one or more sensors coupled to the farming machine. The sensor signals include representations of positioning information of a treatment mechanism of the farming machine.

The farming machine applies the image and sensor signals to a computer model configured to determine a spatial relationship between the treatment mechanism and the plant. The farming machine may identify a set of pixels of the accessed image as the plant. The farming machine may determine, based on the sensor signals, an expected position of the treatment mechanism of the farming machine. The farming machine determines an uncertainty measurement for the expected position of the treatment mechanism. The farming machine may determine, based on the set of pixels and the expected position, an expected position of the identified plant.

The farming machine adjusts the treatment buffer based on the uncertainty measurement for the expected position of the treatment mechanism. The farming machine may generate machine instructions based on the expected position, the set of pixels, and the adjusted treatment buffer. The machine instructions may include instructions for the farming machine to position the treatment mechanism of the farming machine to target the identified plant in the field and perform the plant treatment for the identified plant using the positioned treatment mechanism and the adjusted treatment buffer. The farming machine treats the plant in the field by applying the plant treatment to the plant according to the adjusted treatment buffer, which may be based on the generated machine instructions.

Figure 1A:
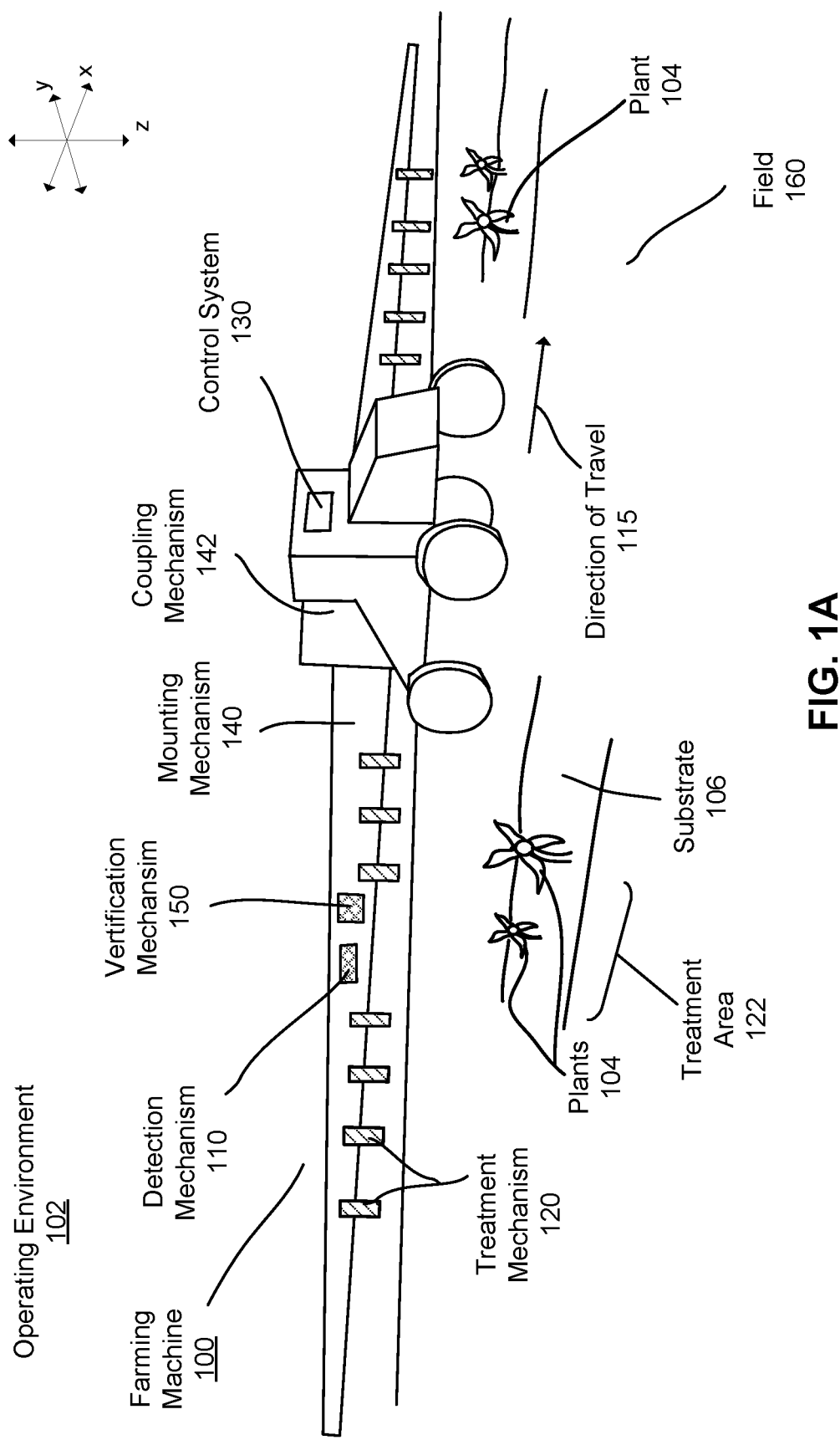
FIG. 1A illustrates an isometric view of a farming machine that performs farming actions of a treatment plan, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

As a farming machine moves through a field, the farming machine applies plant treatments to plants. Plant treatments may include treatment agents like fertilizer, pesticide, or herbicide. Some farming machines broadcast plant treatment indiscriminately across the field as the farming machine moves through the field, but this treatment methodology is wasteful and, in some cases, can unintentionally apply plant treatment to plants that were not targeted for that plant treatment. Also, a farming machine typically carries a limited quantity of plant treatment, and using more plant treatment than needed limits the productivity of the farming machine.

High fidelity (e.g., precise and accurate) application of plant treatment to targeted plants conserves plant treatment and improves the functionality of the farming machine as it moves through the field. That is, increasing treatment precision and accuracy enables the farming machine to treat more plants by using less plant treatment per plant than would occur if the farming machine were broadcasting the plant treatment. However, high fidelity targeting of plant treatment is difficult, especially in farming machines with autonomous or semi-autonomous operational capabilities. As the farming machine targets plants as it moves through the field, the farming machine repeatedly changes location, oftentimes over varying terrain, under changing weather conditions, and with components of the farming machine mechanically altering position. This can all affect plant targeting. Sensor data can be unreliable, potentially leading to error. The latency from gathering data to actuating a treatment mechanism (e.g., turning on a spray nozzle) adds to the complexity of the task. Computing a high fidelity plant treatment plan can be rigorous, further adding complexity and time delay to the operation of the farming machine, circularly impacting precision and accuracy if not accounted for.

These and other factors can impact the precision and accuracy with which a farming machine can target a plant with a treatment mechanism to apply plant treatment. The uncertainty of the precision and accuracy of the plant targeting varies from moment to moment as conditions change, the farming machine's position in relation to the plant changes, and new sensor data is factored by the farming machine. However, a change in uncertainty from one moment to the next can only impact plant targeting so much, as there are feasible limits upon the extent to which the spatial relationship between the farming machine and the plant can change from one moment to the next. As such, quantifying the uncertainty of that spatial relationship, and using this uncertainty measurement as a factor to adjust the region of the field targeted by the farming machine to apply the plant treatment to the plant, can dynamically account for that time-variant uncertainty. This therefore provides greater certainty that the plant was precisely and accurately targeted—as precisely and accurately targeted as is feasible, given the degree of uncertainty of the spatial relationship between the farming machine and the plant.

As is described below, various embodiments of a technique to dynamically adjust a treatment buffer for a plant treatment provide high fidelity targeting of plant treatment, conserving plant treatment and avoiding misapplication of plant treatment. When targeting a plant, the farming machine identifies the plant and targets the plant treatment to both the plant and a buffer zone around the plant. Embodiments herein provide for dynamic adjustment of these treatment buffers based on an uncertainty measurement related to the spatial relationship between the farming machine and the plant.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field, but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
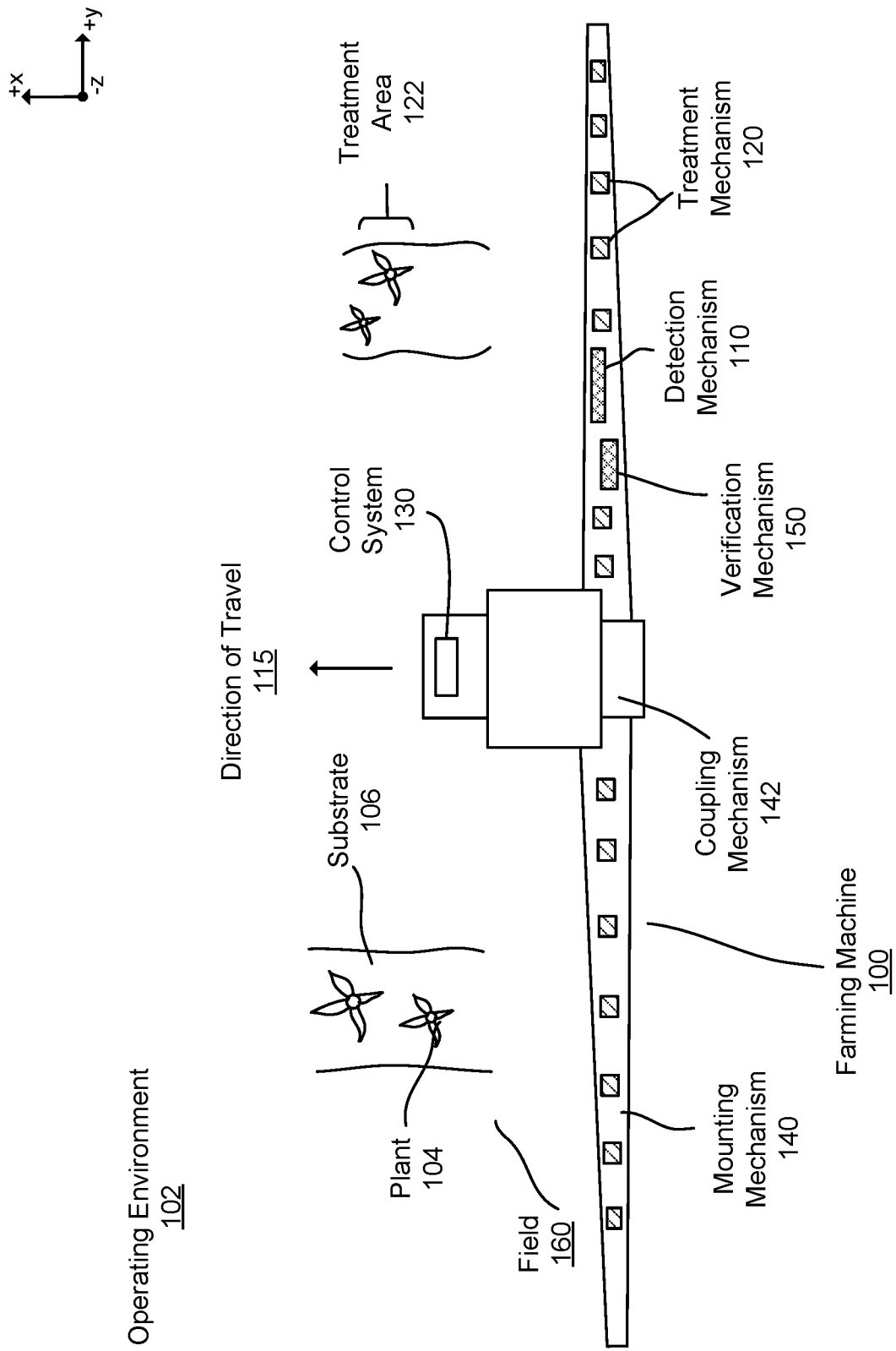
FIG. 1B illustrates a top view of a farming machine, in accordance with the example embodiment.
Figure 1C:
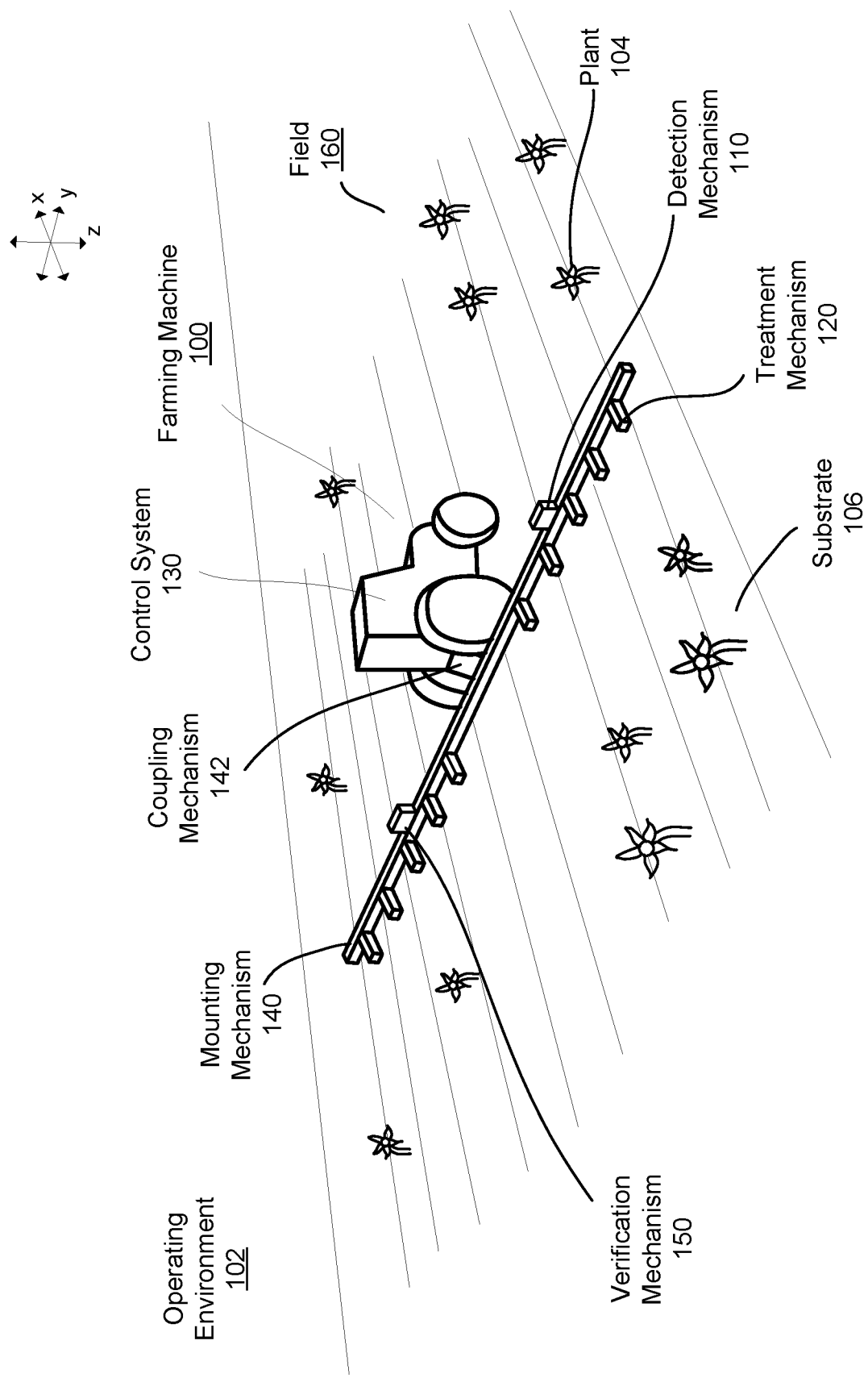
FIG. 1C illustrates an isometric view of a farming machine, in accordance with a second example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment 102

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, ultrasonic sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the field. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action.

The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment (i.e., a plant treatment) to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

In some embodiments, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, the effect of applying a plant treatment with a treatment mechanism 120 to a plant 104 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

In some embodiments, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Some other example treatment mechanisms 120 may include: a flamethrower or a water hose.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may be movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is, translating a farming action of a treatment plan into machine instructions implementable by the treatment mechanism 120.

The control system 130 can be operated wholly or partially autonomously, by a user operating the farming machine 100, a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, and/or a client device, and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

Figure 2:
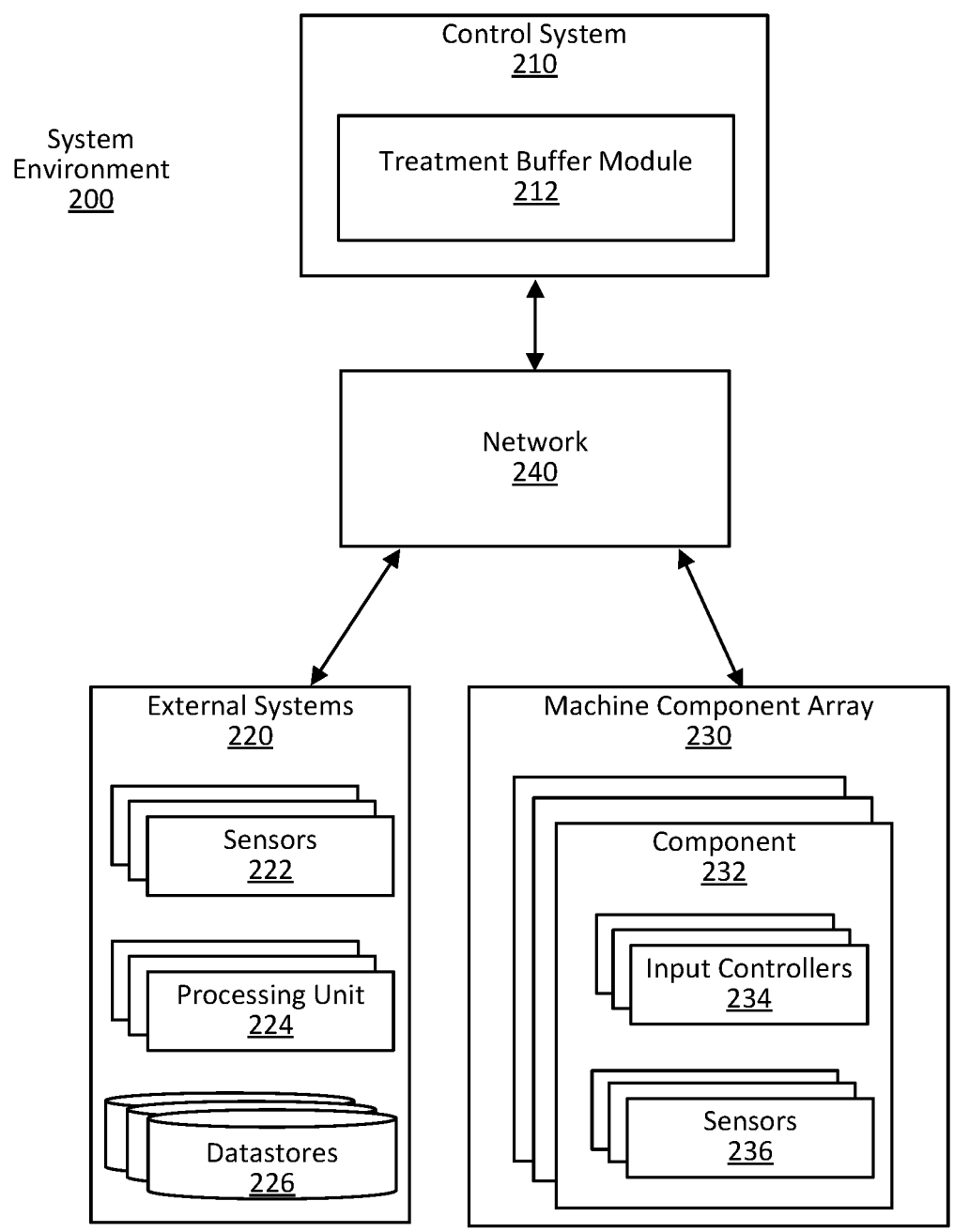
FIG. 2 illustrates a block diagram of a system environment for a farming machine, in accordance with one or more example embodiments.

FIG. 2 is a block diagram of the system environment for the farming machine 100, in accordance with one or more example embodiments. In this example, the control system 210 (e.g., control system 130) is connected to external systems 220 and a machine component array 230 via a network 240 within the system environment 200.

The external systems 220 are any system that can generate data representing information useful for determining and implementing farming actions in a field. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in determining and implementing farming actions in the field. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in determining and implementing farming actions in the field. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 230 receives information from external systems 220 and the machine component array 230 and implements a treatment plan in a field with a farming machine. In particular, the control system 230 employs a treatment buffer module 212 to dynamically determine and implement the application of a plant treatment to a plant using a dynamic treatment buffer.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

Treatment Buffer Control System

Figure 3:
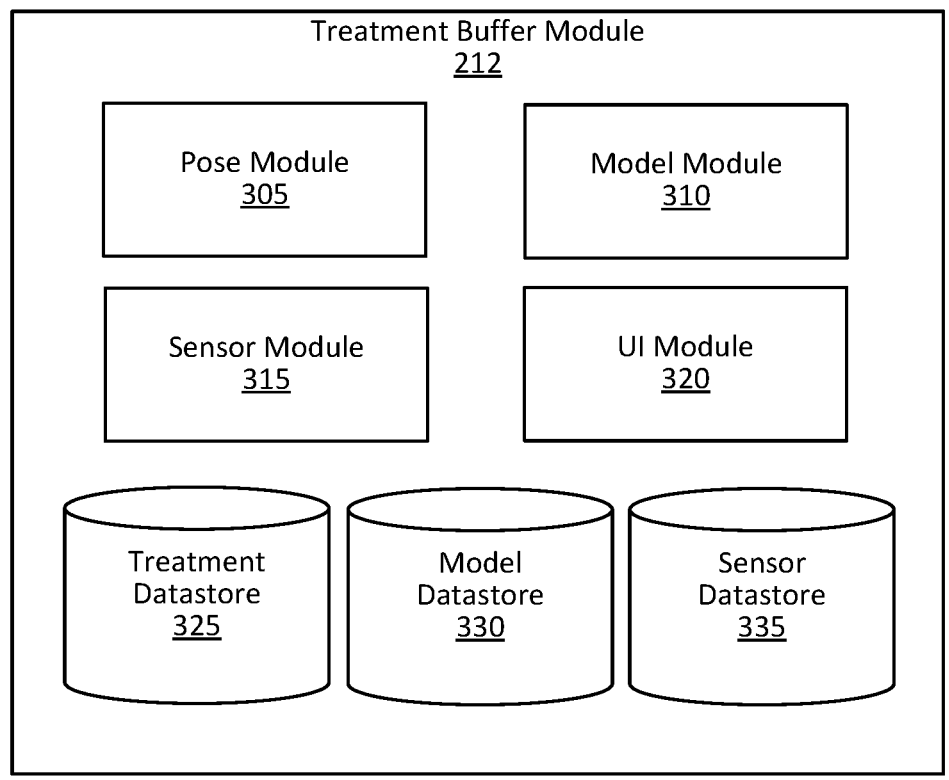
FIG. 3 illustrates a block diagram of a control system of a farming machine, in accordance with one or more example embodiments.

FIG. 3 illustrates a block diagram of the control system 130 of a farming machine, in accordance with one or more example embodiments. The control system 130 dynamically adjusts a treatment buffer of the farming machine 100. The control system 130 includes a pose module 305, a model module 310, a sensor module 315, a user interface (UI) module 320, a treatment datastore 325, a model datastore 330, and a sensor datastore 335. Alternative embodiments may include fewer, other, or additional components that provide the functionality described herein, without departing from the principles and techniques set forth herein. Depending upon the embodiment, the control system 130 may be the control system 210, and one or more of the treatment datastore 325, the model datastore 330, and the sensor datastore 335 may be included in datastores 226.

The pose module 305 coordinates the dynamic adjustment of a treatment buffer of the farming machine 100. Dynamically adjusting the treatment buffer is a change to the treatment buffer while the farming machine is operating in a field. A treatment buffer is a portion of a treatment area to which plant treatment is applied. The treatment area includes an expected position of a plant as well as the treatment buffer, which surrounds the expected position. In an embodiment, the treatment buffer is a circle of particular radius extending from the expected position of the plant. In another embodiment, the treatment buffer is a rectangle. Dynamic adjustment of the treatment buffer is affected by an uncertainty measurement of an expected position. An expected position is a point in space where a thing (e.g., a plant, or a treatment mechanism) is estimated to be (e.g., by a computer model). The expected position can include a target area, which is a region, including the point in space, which the plant is estimated to occupy. An uncertainty measurement is a value representing a degree of uncertainty in the estimate that produces an expected position, such as a variance produced by use of a Kalman filter. Broadcasting a plant treatment is the application of the plant treatment over a maximum area to which the farming machine is capable of applying the plant treatment as it moves through the field.

In other words, as the uncertainty measurement of an expected position changes over time (e.g., the expected position of a treatment mechanism or the expected position of a plant), the pose module 305 adjusts the treatment buffer for a treatment mechanism to apply plant treatment to the plant based on the changes to the uncertainty measurement. The pose module 305 may adjust the treatment buffer periodically, e.g., once per second.

If the uncertainty measurement of the expected position decreases from the determination of one adjustment to the next (e.g., upon the pose module 305 factoring for a new image and/or new sensor signals), the pose module 305 generates a smaller treatment buffer, e.g., a treatment buffer covering a smaller area of the field. Conversely, if the uncertainty measurement of the expected position increases from the determination of one adjustment to the next (e.g., upon the pose module 305 factoring for a new image and/or new sensor signals), the pose module 305 generates a larger treatment buffer, e.g., a treatment buffer covering a larger area of the field. Such techniques are further described below, e.g., with reference to FIG. 5.

In an embodiment, the pose module 305 monitors uncertainty measurements. If an uncertainty measurement exceeds an uncertainty measurement threshold value, the pose module 305 adjusts the treatment buffer such that the farming machine broadcasts the plant treatment. In an embodiment, the uncertainty measurement threshold value includes an uncertainty measurement quantity which a set of consecutive uncertainty measurements exceeds in order for the pose module 305 to broadcast the plant treatment. In an alternative embodiment, the pose module 305 increases the treatment buffer by no more than a maximum amount per adjustment, regardless of a quantity of an uncertainty measurement or a number of consecutive uncertainty measurements that exceed the uncertainty measurement threshold value.

The model module 310 manages the maintenance and use of one or more computer models in the model datastore 330. The model module 310 receives a request from the pose module 305 to apply data (e.g., an image and one or more sensor signals) to one or more computer models managed by the model module 310. The model module 310 applies the data to the one or more computer models and sends the model output to the pose module 305. In an embodiment, the model module 310 processes the model output before sending the model output to the pose module 305. For example, the model module 310 may format the model output into a particular data format. In an embodiment, one or more computer models in the model datastore 330 are machine-learned, and the model module 310 trains and/or re-trains the one or more machine-learned computer models.

The sensor module 315 manages sensor signals received from one or more sensors on the farming machine 100 and/or remote from the farming machine (e.g., from a server providing weather data). The sensor module 315 stores the sensor signals in the sensor datastore 335 and retrieves sensor signals from the sensor datastore 335 upon receipt of a request for a sensor signal from the pose module 305 (e.g., a request for a sensor signal from a particular sensor at a particular time). In an embodiment, the one or more sensors are one or more image sensors (e.g., cameras) on the farming machine 100.

The UI module 320 generates one or more user interfaces to present treatment buffer information. The farming machine 100 may send the one or more user interfaces for presentation to a display on the farming machine 100 or to a remote device. The UI module 320 may use historic treatment data to generate user interfaces. For example, the UI module 320 retrieves treatment data from the treatment datastore 325 and populates a graph of treatment buffer size over time using the retrieved treatment data. As a particular example, the UI module 320 may generate a user interface representing treatment data as a histogram where treatment buffers are bucketized by size and/or uncertainty measurements are bucketized by value, e.g., into three buckets corresponding to "low," "medium," and "high" confidence. A "high" confidence bucket may include uncertainty measurements less than or equal to a first confidence threshold value. A "medium" confidence bucket may include uncertainty measurements between the first confidence threshold value and a second confidence threshold value. A "low" confidence bucket may include uncertainty measurements greater than the second confidence threshold value.

A generated user interface may include a representation of the treatment buffer. For example, the generated user interface may include an electronic map representing the field or a portion of the field and an overlay indicating a sub-portion to which plant treatment was applied at a particular time, a current sub-portion to which plant treatment is in the process of being applied, and/or a future sub-portion to which the farming machine plans to apply plant treatment (e.g., as indicated by generated machine instructions). As another example, the representation of the treatment buffer may include an image of the field (e.g., an image including the plant) and an overlay indicating a region of the field depicted in the image to which plant treatment was applied at a particular time, plant treatment is in the process of being applied, and/or the farming machine plans to apply plant treatment (e.g., as indicated by generated machine instructions). As another example, the representation of the treatment buffer may include a graphical element indicating a confidence level captured by the treatment buffer.

The control system 130 may receive user input via a generated user interface indicating a change to the confidence level captured by the treatment mechanism. For example, user input may indicate that the confidence level for the expected position of the treatment mechanism to which the treatment buffer is to apply plant treatment should change from 95% confidence to 90% confidence. The control system 130 may accordingly update such that the treatment buffer tracks a 90% confidence interval. In an embodiment, the control system 130 may receive a manual override via user input via a generated user interface. The manual override may set the treatment buffer to a particular size, and the control system 130 responsively adjusts the treatment buffer to the particular size. Upon receipt of subsequent user input to end the manual override, the control system 130 terminates the manual override. Depending upon the embodiment, the control system 130 may cease generated treatment buffer adjustments for the duration of a manual override. Alternatively, the control system 130 may generate a treatment buffer adjustment, but refrain rom applying the adjustment to the treatment buffer when a manual override is set.

The treatment datastore 325 is a datastore that records historic treatment data for the farming machine 100. The treatment datastore 325 logs treatment buffers over time. For example, the treatment datastore 325 can include time-series data records storing the uncertainty measurement and/or treatment buffer size for one or more treatment mechanisms 120 at one or more times. Depending upon the embodiment, the treatment datastore 325 may additionally record, for one or more times, whether the treatment buffer was manually overridden at that time, and if so, what the manual override setting of the treatment buffer was at that time. In an embodiment, the treatment datastore 325 stores machine instructions generated by the control system 130, e.g., to position the treatment mechanism and/or perform the plant treatment. In an embodiment, the treatment datastore 325 stores one or more user interfaces for the presentation of treatment buffer information, e.g., user interfaces generated by the UI module 320. In an embodiment, the control system 130 reports one or more logged treatment buffers and/or user interfaces to a remote system.

The model datastore 330 is a datastore that maintains one or more computer models. For example, the model datastore 330 may include a plant identification model, a farming machine location estimation model, and a plant location estimation model. One or more models in the model datastore 330 may include a Kalman filter. In an embodiment, the model datastore 330 stores a computer model that includes a plurality of other computer models. For example, the model datastore 330 may include a plant targeting model that includes a plant identification model, a farming machine location estimation model, and a plant location estimation model.

The sensor datastore 335 stores sensor signals received from one or more sensors (e.g., detection mechanism 110). For example, the sensor datastore 335 may store one or more images captured by imaging sensors on the farming machine 100. When the farming machine (e.g., the control system 130) accesses an image, the farming machine requests the image from the sensor datastore 335, and the sensor datastore 335 sends the accessed image to the control system 130.

Figure 4:
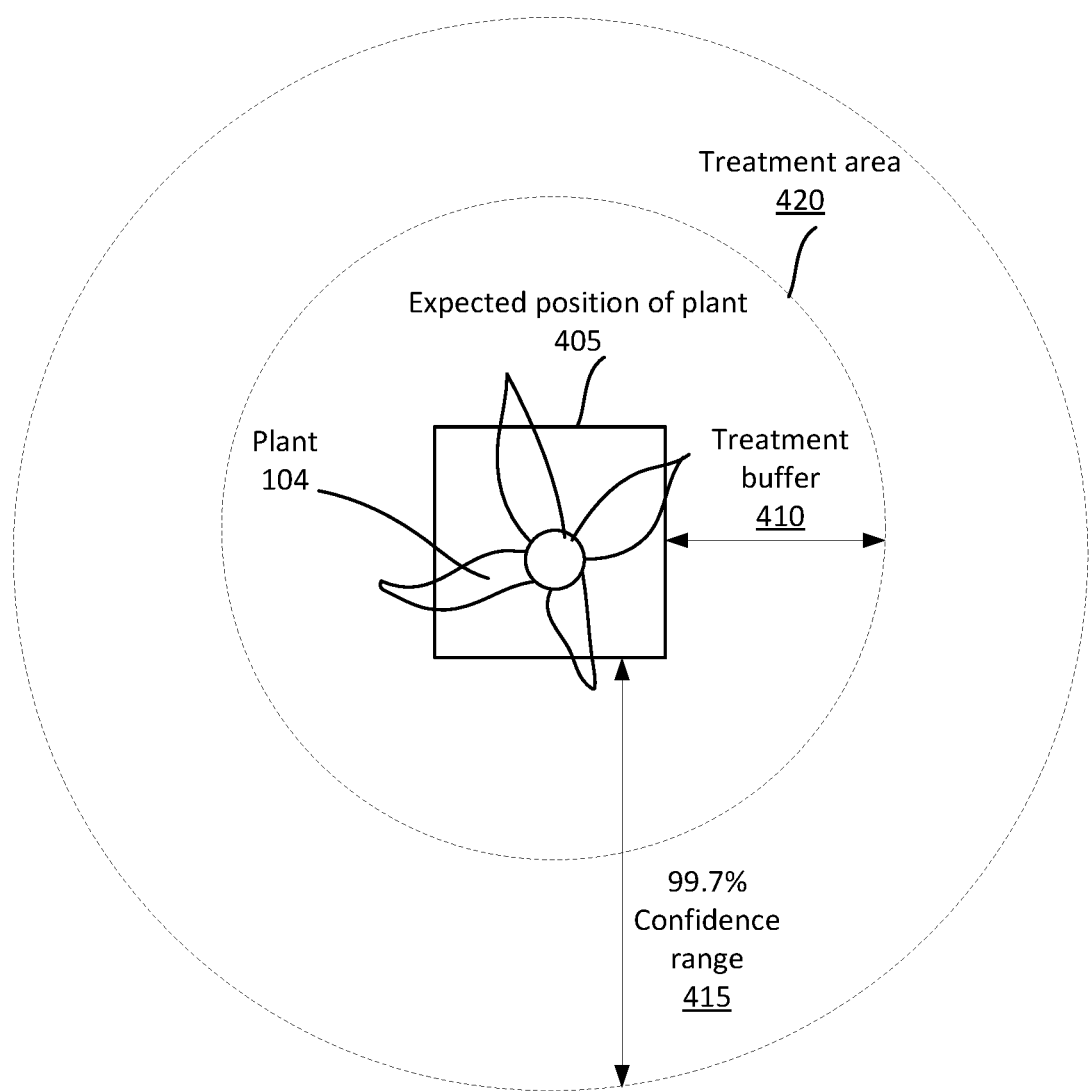
FIG. 4 illustrates a treatment buffer in accordance with one or more example embodiments.

FIG. 4 illustrates a treatment buffer in accordance with one or more example embodiments. The plant 104 is identified by the control system 130 as occupying the expected position of the plant 405. For the application of a plant treatment, the farming machine 100 generates machine instructions to apply the plant treatment to a treatment area 420 including both the expected position of the plant 405 and a treatment buffer 410. In an embodiment, the treatment buffer 410 has a negligible radius, and the treatment area 420 is simply the expected position of the plant 405. However, typically, the treatment area 420 includes the expected position of the plant 405 and a treatment buffer 410 surrounding the expected position of the plant 405. For example, the expected position of the plant 405 may be a point in space and the treatment area 420 is defined by the area of a circle including a treatment buffer 410 of particular radius extending from the point. In alternative embodiments, alternative shapes may be employed by the farming machine 100. For example, the farming machine 100 may determine a treatment area 420 that is rectangular, another geometric shape, or an irregular shape.

The size of the treatment buffer 410, e.g., a radius of the treatment buffer 310 extending from the expected position of the plant 405, can be adjusted based on the uncertainty measurement for the expected position of the treatment mechanism 120 and/or the uncertainty measurement for the expected position of the plant. The expected position of the plant 405 is a probabilistic estimate, and the probability that a given area surrounding the expected position of the plant 405 actually includes the plant 104 increases as the given area grows. The uncertainty measurement impacts the probability that a given area of a particular size includes the plant 104 (e.g., the uncertainty measurement impacts the confidence interval of the expected position of the plant 405). For example, the 99.7% confidence range 415 indicates a given area corresponding to a 99.7% probability of the given area including the plant 104.

The treatment buffer 410 may be adjusted such that the given area captured by the treatment buffer 410 maintains approximately (e.g., within 1% probability) a particular confidence level of containing the plant 104. As such, if the uncertainty measurement grows, the confidence interval corresponding to the particular confidence level will expand, and so the farming machine 100 adjusts the treatment buffer to expand accordingly. Similarly, if the uncertainty measurement lessens, the confidence interval corresponding to the particular confidence level will lessen, and so the farming machine 100 adjusts the treatment buffer to retract towards the expected position of the plant 405 accordingly.

In an embodiment, the treatment buffer 410 can be set (e.g., by an agricultural manager), to include a minimum and/or maximum radius. In an embodiment, the treatment buffer 410 can be manually overridden (e.g., by an agricultural manager), as described above; this manual override can set the treatment buffer 410 at either a particular radius length, or a particular confidence level. For example, the farming machine 100 may receive instructions from an agricultural manager to broadcast the plant treatment, and so the farming machine 100 expands the treatment area 420 to a maximum area supported by the corresponding treatment mechanism 120.

In an embodiment, the treatment buffer 410 is selected by the control system 130 from a set of treatment buffer 410 settings (e.g., treatment buffer sizes) by matching an uncertainty measurement to a bucket, where each setting corresponds to a bucket from a set of buckets that bucketize uncertainty measurements into different ranges. Each bucket is associated with a different treatment buffer 410 setting. The control system 130 matches the uncertainty measurement to a bucket with a respective range including the uncertainty measurement's value and uses the respective treatment buffer 410 setting of the matched bucket.

Figure 5:
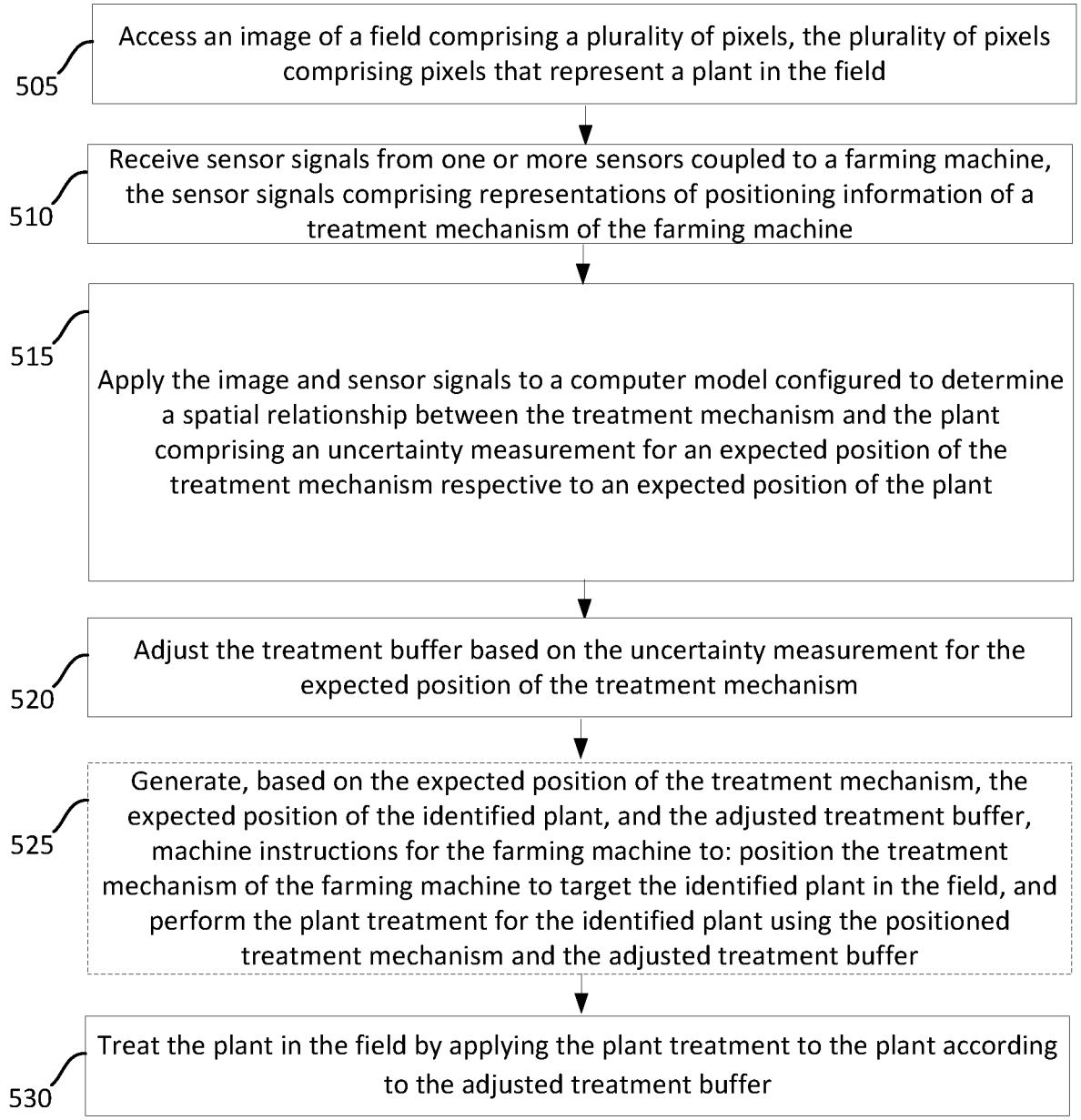
FIG. 5 illustrates a flow chart of a method of a farming machine to dynamically adjust a treatment buffer, in accordance with one or more example embodiments.

FIG. 5 illustrates a flow chart of a method 500 of a farming machine 100 to dynamically adjust a treatment buffer 410, in accordance with one example embodiment.

The farming machine 100 performs a plant treatment in a field. For example, the farming machine may use spray nozzles to apply herbicide to weeds in the field. The farming machine 100 includes one or more detection mechanisms 110 that detect plants in the field. In an embodiment, the detection mechanisms 110 include an imaging sensor (e.g., a camera), and the farming machine 100 stores captured images in memory (e.g., the sensor datastore 335).

The farming machine 100 accesses 505 an image of the field. The image of the field includes a plurality of pixels, and the plurality of pixels includes pixels that represent a plant in the field. The image may be associated with a timestamp indicating a time at which the image was captured, which the farming machine 100 uses, for example, to associate the image with sensor signals received at approximately the same time (e.g., within one tenth of one second). In alternative embodiments, the farming machine 100 may not include an imaging sensor. In such embodiments, the farming machine 100 may employ alternative sensors to detect the plant in the field, and employ techniques described herein without departing from the principles put forth herein.

The farming machine 100 receives 510 sensor signals from one or more sensors coupled to the farming machine. The sensor signals include representations of positioning information of a treatment mechanism of the farming machine. The sensors may include, for example, ultrasonic sensors, imaging sensors, inertial measurement units (IMUs), GPS receivers, and so on. As a particular example, the sensor signals may include a representation of a mounting mechanism elevation above the surface of the field, e.g., a boom height. The farming machine 100 may store sensor signals in memory (e.g., the sensor datastore 335). Sensor signals may be associated with timestamps indicating times at which the sensor signals were received, which the farming machine 100 may use, for example, to associate the sensor signals with other sensor signals received at approximately the same time (e.g., within one tenth of one second).

In an embodiment, the sensor signals can include representations of external condition information. External condition information includes information that can affect the accuracy and precision of estimating an expected position. For example, the external condition information can include data indicating environmental conditions, such as weather information (e.g., measures of sunlight, rain, wind, and so on), soil information (e.g., a topography of the field), plant information (e.g., a height of the plant), and farming machine information (e.g., a speed of the farming machine, a tremor amplitude of a mounting mechanism 140, and so on).

The farming machine 100 applies 515 the image and the sensor signals to a computer model configured to determine a spatial relationship between the treatment mechanism and the plant that includes an uncertainty measurement for an expected position of the treatment mechanism respective to an expected position of the plant. Depending upon the embodiment, the computer model can include multiple computer models, one or more of which may be machine-learned. For example, the computer model may include a plant identification model, a farming machine 100 location estimation model, a plant location estimation model, and so on. In an embodiment, the computer model includes a Kalman filter.

In an embodiment, using the computer model, the farming machine 100 identifies a set of pixels of the accessed image as the plant (e.g., the farming machine 100 performs segmentation upon the image and classifies a segment as the plant 104). Using the computer model, the farming machine 100 determines, based on the sensor signals, an expected position of the treatment mechanism 120 of the farming machine 100. The expected position of the treatment mechanism 120 may include a point in three-dimensional coordinate space in relation to the field. Using the computer model, the farming machine determines an uncertainty measurement for the expected position of the treatment mechanism. For example, the uncertainty measurement can be a value that is a function of the size of a confidence interval for a particular confidence level of the expected position of the treatment mechanism. As a particular example, the uncertainty measurement may be a radius, in inches, of the confidence interval as it extends from the center point of the expected position of the treatment mechanism.

In an embodiment, using the computer model, the farming machine 100 determines, based on the set of pixels and the expected position of the treatment mechanism 120, an expected position of the identified plant 104. Upon determining an expected position of the treatment mechanism 120 and an expected position of the identified plant, the farming machine 100 can determine a spatial relationship between the treatment mechanism and the plant—e.g., a vector from the one to the other, or a position of each in an electronic map of the field. Depending upon the embodiment, the estimated position of the treatment mechanism 120 and the estimated position of the plant may be in terms of a global reference frame (e.g., latitude and longitude, or coordinates within a map of the field), from a reference frame of the treatment mechanism 120, or from a reference frame of the plant.

The farming machine 100 adjusts 520 the treatment buffer of the treatment mechanism 120 based on the uncertainty measurement. For example, the farming machine 100 may grow the treatment buffer such that the treatment area enlarges, or the farming machine 100 may shrink the treatment buffer such that the treatment area decreases in size. In one embodiment, the farming machine 100 includes an adjustment limit upon the extent to which the treatment buffer can change in size from one adjustment of the treatment buffer to the next. This adjustment limit may be based on an extent to which the spatial relationship between the treatment mechanism 120 and the plant 104 can have changed during a time window from one adjustment to a next adjustment. In an embodiment, the computer model includes a Kalman filter, the uncertainty measurement includes a variance of a state estimate of the Kalman filter (e.g., where the state estimate is an expected position of the treatment mechanism), and the treatment buffer size is a function of (e.g., directly correlated with) a number of (e.g., two) standard deviations of the variance.

In an embodiment, the farming machine 100 varies a rate of application of the plant treatment via the treatment mechanism based on the uncertainty measurement. For lower uncertainty measurements, the farming machine applies plant treatment at a greater rate, and for lower uncertainty measurements, the farming machine applies plant treatment at a lesser rate.

In an embodiment, the farming machine 100 may generate 525, based on the expected position of the treatment mechanism, the expected position of the identified plant, and the adjusted treatment buffer, machine instructions for the farming machine to position the treatment mechanism of the farming machine to target the identified plant in the field, and perform the plant treatment for the identified plant using the positioned treatment mechanism and the adjusted treatment buffer. The farming machine 100 positioning the treatment mechanism can include physically calibrating the treatment mechanism, such as altering its position upon the farming machine 100, changing a direction the treatment mechanism faces with respect to the field, growing or shrinking an aperture of the treatment mechanism, or so on. Alternatively or additionally, the farming machine 100 positioning the treatment mechanism can include setting a number of treatment mechanisms to activate (e.g., turn on or off), and/or a window of time for which the treatment mechanism(s) activate to apply plant treatment to the treatment area (e.g., the machine instructions may include a start time at which a treatment mechanism turns on, and an end time at which the treatment mechanism turns off, for one or more treatment mechanisms). For example, if the farming machine includes 100 spray nozzles, the farming machine may set five particular spray nozzles to activate for a particular five second window of time in order to apply plant treatment to the plant 104. In an embodiment, the treatment mechanism 120 is a spray nozzle, the treatment buffer is a spray buffer, and the plant treatment is a fluid that the treatment mechanism sprays. Adjusting the treatment buffer in this embodiment can include adjusting a duration for which the spray nozzle sprays fluid, adjusting a number of spray nozzles activated on the treatment mechanism, adjusting an aperture of the spray nozzle, adjusting a direction and/or position of the spray nozzle, and/or adjusting a pulse width modulation duty cycle of the spray nozzle.

The farming machine 100 treats 530 the plant in the field by applying the plant treatment to the plant according to the adjusted treatment buffer. This may be based on the generated machine instructions, if machine instructions are generated 525 as described.

Example Uncertainty Measurement Factors

Depending upon the embodiment, the factors accounted for by the pose module 305 in determining the uncertainty measurement can be one or more of a variety of factors, including but not limited to the image data and sensor data described above. These factors can include one or more of the following, depending upon the embodiment.

Terrain variation assumption: The pose module 305 may factor for the roughness of the terrain of the field in which the farming machine operates. Terrain roughness, or terrain variation, is a representation of how uneven the terrain is. This can be based on various sensor data, such as height sensor data, accelerometer data, and so on. Terrain roughness can contribute to the uncertainty measurement due to the difference between where height is measured and where the camera and nozzle are located. Roughness of the terrain varies with region, soil type, and farming practices (irrigated vs. not, till vs. no-till, and so on).

The pose module 305 may also factor for terrain variation error based on the height of plants creating a projection error in pixels of image data representing the plant. The pose module 305 may measure the height of the plant and use the height to scale the error.

The pose module 305 may also factor for terrain variation error based on spray factors. Variation in the height of the plant, at least partially due to variation in the terrain height, can create error, which the pose module 305 factors for.

Boom height measurement error: Sensor data representing boom height has inherent error. The pose module 305 may measure the noise of sensor data to scale the error estimation, and filter out sensor data with at least a threshold amount of noise.

IMU measurement error: The pose module 305 may factor for the error of the IMU, and may factor for the amount of motion overall, where greater detected motion signals greater uncertainty, and less detected motion signals less uncertainty.

GPS error: The pose module 305 may factor for heading error in GPS data, as well as whether the GPS system is using real time kinematics (RTK) to enhance accuracy. The pose module 305 may compare variations in farming machine speed, as determined by GPS tracings, to known farming machine information, such as the mass of the farming machine, to check for error in the GPS-determined speed.

Vehicle acceleration error: The pose module 305 may factor for error in acceleration calculation by comparing sensor data from the IMU, GPS, and/or other sensors to estimate error due to acceleration, which the pose module 305 can then factor for.

Detection error: The pose module 305 may factor for misclassification of pixels in image data, such as pixels at the boundary of crops and weeds. The pose module 305 may use proximity of the misclassified pixel to pixels representing the plant to scale the error generated by the misclassification, which can be factored for by the pose module 305.

Intrinsic camera calibration error: The pose module 305 may factor for the warping of image data, which can cause error. Error from warped image data is magnified at the edges and corners of an image. The pose module 305 may factor for the position of the plant within the image data to scale the error provided by the warping of the image data.

Extrinsic camera calibration error: The pose module 305 may factor for image-to-image error and camera-to-camera calibration error. The pose module 305 may factor for differences in the calibration between different cameras, and differences in image data produced by the different cameras.

Nozzle calibration error: The pose module 305 may factor for error in nozzle calibration. The pose module 305 may use variation in nozzle calibration variables over time, or functions of nozzle type, to scale the error.

Quantization: The pose module 305 may factor for quantization done by the farming machine, such as map resolution, spray timing, and image resolution reduction. Each of these may create an artificial buffer and thus reduces the need for additional buffering. Timing-related quantization may be factored for by the pose module 305 as a function of farming machine speed.

Spray command delay variation: The pose module 305 may factor for a time delay between sending and receiving a spray command, which can be variable and therefore generate error. This variation can be measured and factored for by the pose module 305, which may scale the error as a faction of traffic on a bus or baud rate of the farming machine.

Processing time variation: The pose module 305 may factor for the processing time of a spray command, which may be variable, and may be affected by factors such as processor speed and load time on various components of the farming machine. The pose module 305 may further factor for the timing of when a message is received in an event loop.

Valve transition variation: The pose module 305 may factor for the time involved in opening or closing a valve, which can be variable, and sometimes measured directly. This variation can be factored by the pose module 305 in estimating error.

Pressure variation: The pose module 305 may factor for pressure at a valve, which can affect the speed of droplets exiting the nozzle connected to the valve. Measuring this variation directly can be used to estimate error, and indirectly estimating variation using the number of nozzles on at a given time may be employed by the pose module 305 also.

Droplet size variation: The pose module 305 may factor for the distribution of droplet sizes produced by each nozzle. The tightness of the distribution of each nozzle can affect error. Factors that influence droplet size include chemistry in the material (e.g., surfactants), temperature, humidity, overall pressure, nozzle type, and so on.

Wind: The pose module 305 may factor for wind conditions when generating the uncertainty measurement, where greater wind speeds generate greater error. The scale of the error may be modeled by the pose module 305 based on factors such as droplet size, boom height, machine speed, system pressure, and ambient environmental conditions.

Boom motion and flex: The pose module 305 may factor for lash and other motions generated by joints of the boom, as well as the flexing of individual segments of the boom. This motion can be modeled by the pose module 305 and an estimate of the movement can be scaled by the pose module 305 based on sensor data and other farming machine data, such as speed, steering, IMU measurements, and so on.

Flow development variation: The pose module 305 may factor for nozzle timing variation. Nozzle timing can be impacted by the development of flow within the valve body and nozzle tip cavity. The impact can be based on valve type and/or nozzle type, and the pose module 305 may directly measure the nozzle timing variation to account for respective error created by such variation.

Nozzle wear: The pose module 305 may factor for nozzle flow rate variation, which produces error. Nozzle flow rates may vary based on manufacturing tolerances and/or wear over time. Changes in flow rates affect droplet velocity and therefore spray timing. This variation can be measured or estimated based on nozzle use by the pose module 305. For example, the pose module 305 may track nozzle use on a per-nozzle basis and use this to estimate the flow rate.

Various other sources of error can be used by the pose module 305 to inform the uncertainty measurement without departing from the principles set forth herein.

IV. Computer Components

Figure 6:
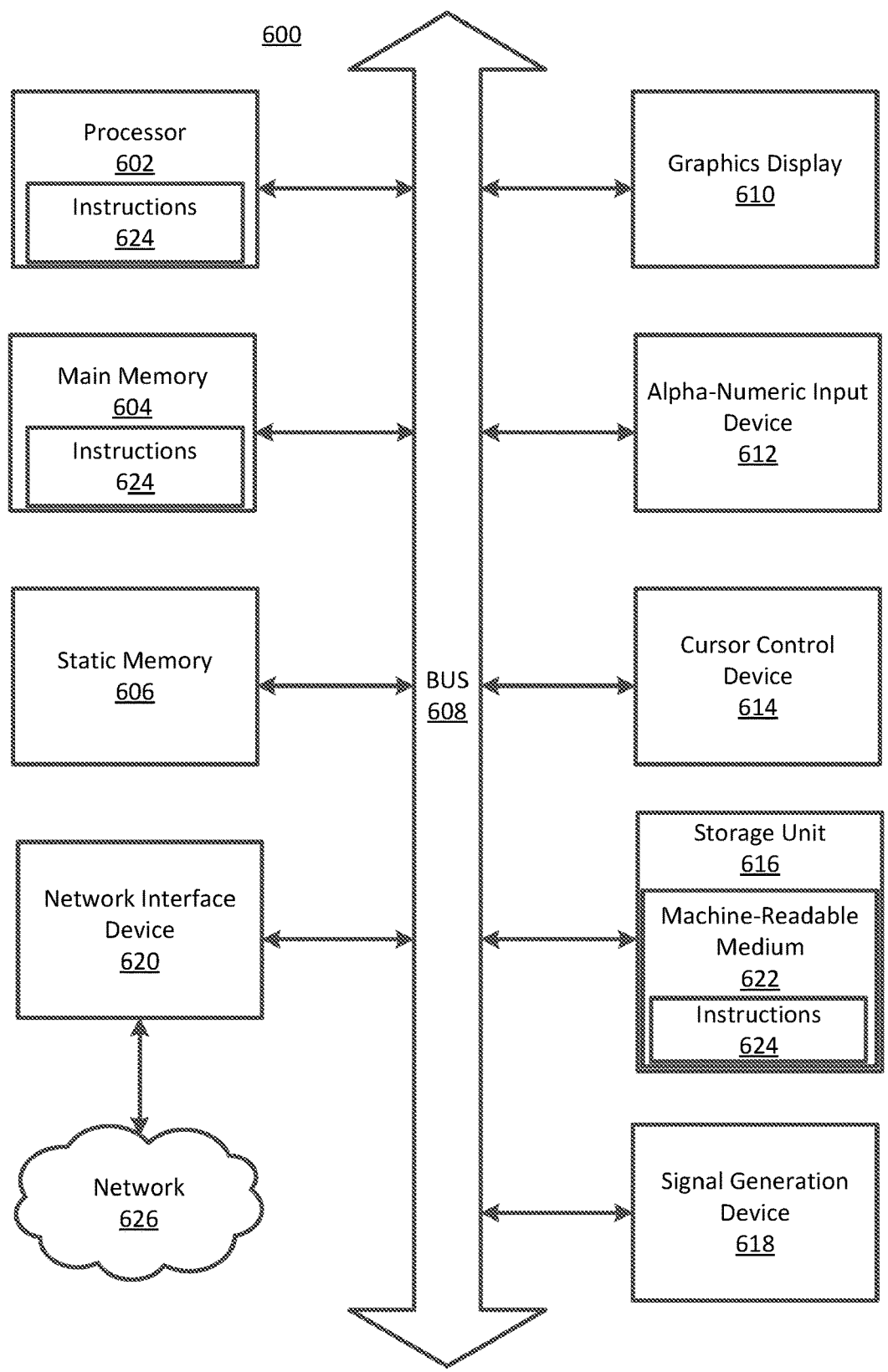
FIG. 6 illustrates a block diagram of components of an example machine for reading and executing instructions from a machine-readable medium, in accordance with one or more example embodiments.

FIG. 6 is a block diagram illustrating components of an example machine for reading and executing instructions from a machine-readable medium. Specifically, FIG. 6 shows a diagrammatic representation of control system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 130 described in FIGS. 2-3. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 220) via the network interface device 620.

V. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a farming machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for a farming machine in a field to dynamically adjust a treatment area for an individual plant during performance of a plant treatment in the field, the treatment area including an expected position of the individual plant and a treatment buffer around the expected position of the individual plant, the expected position of the individual plant being a region which the individual plant is estimated to occupy, the method comprising:

accessing an image of the field comprising a plurality of pixels, the plurality of pixels comprising pixels that represent the individual plant in the field;

receiving one or more sensor signals from one or more sensors coupled to the farming machine, the one or more sensor signals comprising representations of positioning information of a treatment mechanism of the farming machine;

applying the image and the one or more sensor signals to a computer model configured to determine a spatial relationship between the treatment mechanism and the individual plant, the computer model outputting a first uncertainty measurement value for an expected position of the treatment mechanism respective to the expected position of the individual plant;

determining the first uncertainty measurement value does not exceed an uncertainty threshold value, wherein exceeding the uncertainty threshold value corresponds to a spray mode for broadcast plant treatments;

responsive to determining the first uncertainty measurement value does not exceed the uncertainty threshold value, adjusting the treatment buffer for the individual plant based on the first uncertainty measurement value for the expected position of the treatment mechanism, wherein adjusting the treatment buffer comprises changing a size of the treatment buffer around the expected position of the individual plant; and treating the individual plant in the field by applying the plant treatment to the individual plant according to the adjusted treatment buffer.

2. The method of claim 1, further comprising:
determining a second uncertainty measurement value exceeds the uncertainty threshold value, the second uncertainty measurement value being higher than the first uncertainty measurement value; and responsive to determining the second uncertainty measurement value exceeds the uncertainty threshold value, further adjusting the treatment buffer to broadcast the plant treatment.

3. The method of claim 1, wherein the plant treatment is a fluid, the treatment buffer is a spray buffer, the treatment mechanism comprises a spray nozzle, and adjusting the treatment buffer comprises one or more of:
adjusting a duration for which the spray nozzle sprays fluid;
adjusting a number of spray nozzles activated on the treatment mechanism;
adjusting an aperture of the spray nozzle; and
adjusting a pulse width modulation duty cycle of the spray nozzle.

4. The method of claim 1, wherein the one or more sensor signals further comprise representations of external condition information, the method further comprising:
adjusting the treatment buffer based on the one or more sensor signals representing external condition information.

5. The method of claim 1, further comprising:
receiving manual override instructions to adjust the treatment buffer to a particular setting;
adjusting the treatment buffer to the particular setting; and
locking the treatment buffer to the particular setting such that the particular setting overrides further adjustments based on new uncertainty measurement values.

6. The method of claim 1, wherein adjusting the treatment buffer based on the first uncertainty measurement value further comprises:
determining a matching bucket of a plurality of three or more buckets that bucketize uncertainty measurement values into different ranges, wherein each bucket is associated with a different treatment buffer setting, and the matching bucket includes the first uncertainty measurement value in a respective range of uncertainty measurement values; and responsive to determining the matching bucket, adjusting the treatment buffer to the treatment buffer setting associated with the matching bucket.

7. The method of claim 1, further comprising:
accessing a new image of the field captured after the image in the field;
determining a new uncertainty measurement value based on the new image that is less than the first uncertainty measurement value; and
adjusting the treatment buffer from covering a first area of the field to covering a smaller second area of the field.

8. The method of claim 1, further comprising:
accessing a new image of the field captured after the image in the field;
determining a new uncertainty measurement value based on the new image that is greater than the first uncertainty measurement value; and
adjusting the treatment buffer from covering a first area of the field to covering a larger second area of the field.

9. The method of claim 1, further comprising one or more of:
recording the adjusted treatment buffer in a log; and
reporting the adjusted treatment buffer to a remote system.

10. The method of claim 1, further comprising:
generating a user interface that visually represents the treatment buffer.

11. The method of claim 10, further comprising:
sending the generated user interface to a user device for display;
receiving user input to adjust the treatment buffer via the generated user interface; and
adjusting the treatment buffer according to the received user input.

12. The method of claim 1, further comprising:
varying a rate of application of the plant treatment based on the first uncertainty measurement value.

13. The method of claim 1, wherein applying the image and the one or more sensor signals to the computer model comprises:
identifying a set of pixels of the accessed image as the individual plant;
determining, based on the one or more sensor signals, the expected position of the treatment mechanism of the farming machine;
determining the first uncertainty measurement value for the expected position of the treatment mechanism; and
determining, based on the set of pixels and the expected position of the treatment mechanism, the expected position of the individual plant.

14. The method of claim 13, further comprising:
generating, based on the expected position of the treatment mechanism, the expected position of the individual plant, and the adjusted treatment buffer, machine instructions for the farming machine to:
position the treatment mechanism of the farming machine to target the individual plant in the field, and
perform the plant treatment for the individual plant using the positioned treatment mechanism and the adjusted treatment buffer;
wherein treating the individual plant in the field is based on the generated machine instructions.

15. The method of claim 1, wherein neither the pre-adjusted treatment buffer nor the adjusted treatment buffer correspond to a broadcast plant treatment.

16. The method of claim 1, wherein changing the size of the treatment buffer comprises increasing or decreasing the size of the treatment buffer in proportion to a degree of uncertainty of the first uncertainty measurement value.

17. A farming machine configured to perform operations comprising: accessing, with a control system of the farming machine, an image of a field comprising a plurality of pixels, the plurality of pixels comprising pixels that represent an individual plant in the field;
receiving, using the control system, one or more sensor signals from one or more sensors coupled to the farming machine, the one or more sensor signals comprising representations of positioning information of a treatment mechanism of the farming machine;
applying, using the control system, the image and the one or more sensor signals to a computer model configured to determine a spatial relationship between the treatment mechanism and the individual plant, the computer model outputting first uncertainty measurement value for an expected position of the treatment mechanism respective to an expected position of the individual plant, the expected position of the individual plant being a region which the individual plant is estimated to occupy;
determining the first uncertainty measurement value does not exceed an uncertainty threshold value, wherein exceeding the uncertainty threshold value corresponds to a spray mode for broadcast plant treatments;
responsive to determining the first uncertainty measurement value does not exceed the uncertainty threshold value, adjusting, using the control system, a treatment buffer for the individual plant based on the first uncertainty measurement value for the expected position of the treatment mechanism, the treatment buffer being around the expected position of the individual plant, wherein adjusting the treatment buffer comprises changing a size of the treatment buffer around the expected position of the individual plant; and
treating, by the treatment mechanism, the individual plant in the field by applying a plant treatment to the individual plant according to the adjusted treatment buffer.

18. The farming machine of claim 17, wherein neither the pre-adjusted treatment buffer nor the adjusted treatment buffer correspond to a broadcast plant treatment.

19. The farming machine of claim 17, wherein the plant treatment is a fluid, the treatment buffer is a spray buffer, the treatment mechanism comprises a spray nozzle, and adjusting the treatment buffer comprises one or more of:
adjusting a duration for which the spray nozzle sprays fluid;
adjusting a number of spray nozzles activated on the treatment mechanism;
adjusting an aperture of the spray nozzle; and
adjusting a pulse width modulation duty cycle of the spray nozzle.

20. The farming machine of claim 17, wherein the one or more sensor signals further comprise representations of external condition information, the farming machine further configured to:
adjust, using the control system, the treatment buffer based on the one or more sensor signals representing external condition information.

21. The farming machine of claim 17, further configured to:
access, using the control system, a new image of the field captured after the image in the field;
determine, using the control system, a new uncertainty measurement value based on the new image that is greater than the first uncertainty measurement value; and
adjust, using the control system, the treatment buffer from covering a first area of the field to covering a larger second area of the field.

22. The farming machine of claim 17, wherein applying the image and the one or more sensor signals to the computer model comprises:
identifying a set of pixels of the accessed image as the individual plant;
determining, based on the one or more sensor signals, the expected position of the treatment mechanism of the farming machine;
determining the first uncertainty measurement value for the expected position of the treatment mechanism; and
determining, based on the set of pixels and the expected position of the treatment mechanism, the expected position of the individual plant.

23. A non-transitory computer-readable storage medium comprising instructions that, when executed by a computer, cause the computer to:
access, with a control system of a farming machine, an image of a field comprising a plurality of pixels, the plurality of pixels comprising pixels that represent an individual plant in the field;
receive, using the control system, one or more sensor signals from one or more sensors coupled to the farming machine, the one or more sensor signals comprising representations of positioning information of a treatment mechanism of the farming machine;
apply, using the control system, the image and the one or more sensor signals to a computer model configured to determine a spatial relationship between the treatment mechanism and the individual plant, the computer model outputting a first uncertainty measurement value for an expected position of the treatment mechanism respective to an expected position of the individual plant, the expected position of the individual plant being a region which the individual plant is estimated to occupy;
determine the first uncertainty measurement value does not exceed an uncertainty threshold value, wherein exceeding the uncertainty threshold value corresponds to a spray mode for broadcast plant treatments;
responsive to the determination that the first uncertainty measurement value does not exceed the uncertainty threshold value, adjust, using the control system, a treatment buffer for the individual plant based on the first uncertainty measurement value for the expected position of the treatment mechanism, the treatment buffer being around the expected position of the individual plant, wherein to adjust the treatment buffer the instructions further cause the computer to: change a size of the treatment buffer around the expected position of the individual plant; and treat, by the treatment mechanism, the individual plant in the field by applying a plant treatment to the individual plant according to the adjusted treatment buffer.

* * * * *